United States Patent
Jones et al.

[11] Patent Number: 5,837,897
[45] Date of Patent: Nov. 17, 1998

[54] TESTING VEHICLE TIRES

[75] Inventors: Barbara L. Jones, King'Lynn; Thomas F. Wylie, March, both of United Kingdom

[73] Assignee: Sun Electric U.K. Limited, King's Lynn, England

[21] Appl. No.: 686,964

[22] Filed: Jul. 25, 1996

[30] Foreign Application Priority Data

Jul. 27, 1995 [GB] United Kingdom ................... 9515454

[51] Int. Cl.⁶ .................................................. G01N 29/20
[52] U.S. Cl. .......................... 73/599; 73/146; 73/146.2; 73/600
[58] Field of Search ............................. 73/146, 597, 598, 73/599, 600, 602, 620, 622, 624, 627, 628, 629, 146.2

[56] References Cited

U.S. PATENT DOCUMENTS

| | | | |
|---|---|---|---|
| 3,815,407 | 6/1974 | Lavery | 73/146 |
| 3,882,717 | 5/1975 | McCauley | 73/600 |
| 3,894,421 | 7/1975 | Sperberg | 73/146 |
| 3,919,882 | 11/1975 | Wells | 73/146 |
| 4,059,989 | 11/1977 | Halsey | 73/598 |
| 4,089,225 | 5/1978 | Kraska et al. | 73/614 |
| 4,089,226 | 5/1978 | Kraska et al. | 73/614 |
| 4,266,428 | 5/1981 | Ho | 73/146 |
| 4,274,289 | 6/1981 | Weiss et al. | 73/618 |
| 4,275,589 | 6/1981 | Dugger et al. | 73/146 |
| 4,285,235 | 8/1981 | Dugger | 73/146 |
| 4,297,876 | 11/1981 | Weiss | 73/146 |
| 4,327,579 | 5/1982 | Weiss | 73/146 |
| 4,337,660 | 7/1982 | Weiss | 73/600 |
| 4,469,450 | 9/1984 | DiVincenzo | 374/119 |
| 4,472,974 | 9/1984 | Dickson et al. | 73/635 |
| 4,936,138 | 6/1990 | Cushman et al. | 73/146 |
| 5,095,744 | 3/1992 | Macecek et al. | 73/146 |
| 5,341,687 | 8/1994 | Stan | 73/146 |

*Primary Examiner*—Michael Brock
*Assistant Examiner*—Rose M. Miller
*Attorney, Agent, or Firm*—Emrich & Dithmar

[57] ABSTRACT

There is disclosed a method and apparatus for testing inflated vehicle tires to determine internal physical characteristics such as tire pressure. The apparatus includes a waveform transceiver for subjecting a tire to be tested to a transmitted waveform and for transmitting an ultrasonic waveform from a location external to the tire under test and for receiving the ultrasonic waveform from a tire under test at a location external thereto; and a processor for interpreting the received waveform with reference to the decay or attenuation of the amplitude of the waveform with time to provide a measure of the internal physical characteristic.

5 Claims, 4 Drawing Sheets

TESTING VEHICLE TIRES

BACKGROUND OF THE INVENTION

1. Field of the Invention

This invention relates to a method and apparatus for testing vehicle tires, for example to determine the internal pressure thereof. The method and apparatus are also applicable to the determination of other physical characteristics including tire thickness, the presence of an inner tube, and the wear characteristic of the tire after a period of use.

An example of a particular application of the invention is in automotive tire and wheel testing apparatus such as equipment used for determining such characteristics as wheel balance and tire compliance with official regulations. A need for enhancement of the versatility of such apparatus has been identified so that there can be carried out conveniently at the same time additional tests such as a determination of tire pressure, tire wear and/or related characteristics.

2. Description of the Prior Art

Prior proposals in relation to the measurement of tire pressure have included force detectors and the conventional measurement of the pressure at the inlet valve by means of diaphragm or bourbon type pressure sensors. These proposals require an operator to place and fit and remove the sensor in relation to the tire, and in some cases, interpretation of the results are required. All this is a time consuming operation which is nevertheless still suspectable to the production of data errors.

From a technical viewpoint, it is desirable that tire testing is carried out at the recommended working pressure of the tire in question, whereby the need for rapid and convenient tire pressure determination is of considerable importance as one part of a program of tire testing.

Other prior proposals in relation to tire pressure sensing include the following.

USSR Pat. Nos. 518 386 and 414 506 disclose apparatus involving drum and roller systems incorporating braking facilities to enable tire evaluation by sensing distortion and deformation thereof. Such a mechanical approach to tire evaluation is unnecessarily costly and complex and not adapted to provide the convenient production of a spectrum of data relating to the tire under test.

There is disclosed in U.S. Pat. No. 5,181,423, WIPO no. 82 02249 and in German publication no. 29 36 213 tire test apparatus comprising oscillator systems in which there are included both rotary and non-rotary sensors, the rotary sensors being mounted on the tire under test, and coupling means being provided between the sensors, such as an inductive coupling. Tire evaluation is carried out by means of, for example, strain gauge techniques. Systems involving the requirement to mount a rotary sensor on the tire or wheel under test represent an unacceptable level of complication and inconvenience in use.

Proposals also exist for the use of techniques for the determination of external tire dimensions by the use of non-mechanical tire contact systems, such as an ultrasonic waveform, the waveform being used as a non-contact means permitting the tire external dimensions to be sensed during rotation by reference to (for example) the linear movement required for movement between positions corresponding to tangential contact of the beam with opposite side walls of the tire.

U.S. Pat. No. 4,089,226 discloses a system for residual tire life prediction by ultrasound. There is disclosed a pulse ultrasonic reflection system in which pulses of ultrasonic energy are transmitted into an area of a tire in a manner to provide pulses of reflected acoustic energy so that each reflected pulse includes reflected ultrasonic energy from the plies of the casing of the tire. The method includes a determination of the difference between the information thus-obtained from a given tire and that obtainable from the same ply or plies of an unused new tire of the same type. U.S. Pat. Nos. 4,469,450 and 4,059,989 make similar disclosures. U.S. Pat. No. 4,472,974 discloses a roller-type ultrasonic tire inspection system in which a roller carrying an ultrasonic transducer engages the tread of a tire to be inspected. U.S. Pat. No. 5,341,687 discloses a three-dimensional pressure sensor utilizing ultrasonic energy to stimulate a piezoelectric transducer which senses tire pressure. Prior U.S. patents disclosing the use of ultrasonic techniques for tire inspection and requiring the location of one or more ultrasonic transducers within the tire casing include: U.S. Pat. Nos. 3,882,717, 4,266,428, 4,274,289, 4,275,589, 4,285,235, 4,297,876, 4,327,579, 4,337,660, 4,936,138 and 5,095,744.

SUMMARY OF THE INVENTION

An object of the present invention is to provide a method and apparatus offering improvements in relation to the determination of physical characteristics of tires, such as pressure, without the need for direct mechanical intervention with the tire during testing as required by prior proposals, or otherwise providing improvements in relation to matters discussed herein. In the embodiment of the invention described below, there are provided advantages in relation to convenience of fitting and use, together with simplification of structure and the provision of more widely ranging information than has been hitherto available from prior systems.

According to the invention there is provided a method and apparatus for testing vehicle tires as defined in the accompanying claims.

In an embodiment, there is provided a method and apparatus in which the ultrasonic waveform is transmitted to the tire to be tested from an external location with respect to the tire, and the waveform is likewise received at a location external to the tire. By this means, the advantage is provided that the tire testing procedure requires no intervention in a mechanical sense with the tire at all and can all be carried out externally thereof. The ultrasonic transmitter and receptor apparatus may be located in contact with the tire or at a distance of up to approximately 4 inches (10 centimeters) from the tire. In the case of non-contact between the transmitter/sensor apparatus and the tire, the tire can of course rotate during the test.

In the described embodiment, the interpretation of the received waveform is carried out by reference to its decay or attenuation in amplitude with respect to time.

The decay of the waveform between the inner walls of the tire is expressed by the following function relating the pressure (P) within the tire to an attenuation constant ($\alpha$) and the tire inner width (r) between the tire walls, between which the pulse travels:

$$P\alpha(e^{-4\alpha r}); OR\, P = K(e^{-4\alpha r})$$

Also in the embodiment, the interpretation step of the method is carried out with reference to the decay of the intensity or amplitude of the ultrasonic waveform peaks, as they are affected by the tire structure. Thus, for example, this approach enables the condition and spacing of the tire braid or plies to be determined.

The embodiments of the invention described below utilize an ultrasonic transducer as an aid for vehicle tire pressure determination, and likewise to detect the presence of an inner tube or foreign material within the tire, or indeed the nature of the metallic lattice or ply structure within the polymeric wall material of the tire, together with the detection of internal flaws within the tire wall. The embodiments also provide a general statement with respect to the condition of the material of the tires.

The term "ultrasonic" as used in this specification refers to a waveform having a frequency above the usual upper human hearing limit of approximately 21,000 Hz.

The embodiments of the invention described below are applicable to the measurement of tire pressure in vehicle diagnosis techniques, and are particularly applicable to vehicle wheel balance apparatus and test lanes. Indeed, the embodiments provide advantages whenever there is limited access to the tire inflation valve and can also be used to determine tire thickness, the presence of an inner tube and the distance between tire walls.

In the embodiments, the apparatus is incorporated into wheel balancing apparatus so as to provide an automated tire pressure reading facility which removes the requirement for operator intervention for this purpose. Moreover, the reliability of the pressure measurement is increased in this way since the measurement can be taken at closely spaced time intervals and the result averaged and displayed. Moreover, the apparatus is able to provide, in addition to a determination of tire pressure, data or a visual display enabling identification of tire defects, even where these have no visible external physical manifestation.

In an envisaged alternative embodiment, the waveform transmitted for the purpose of tire testing, or indeed for use in relation to the testing of other articles, is at a frequency differing from that of ultrasonic energy.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
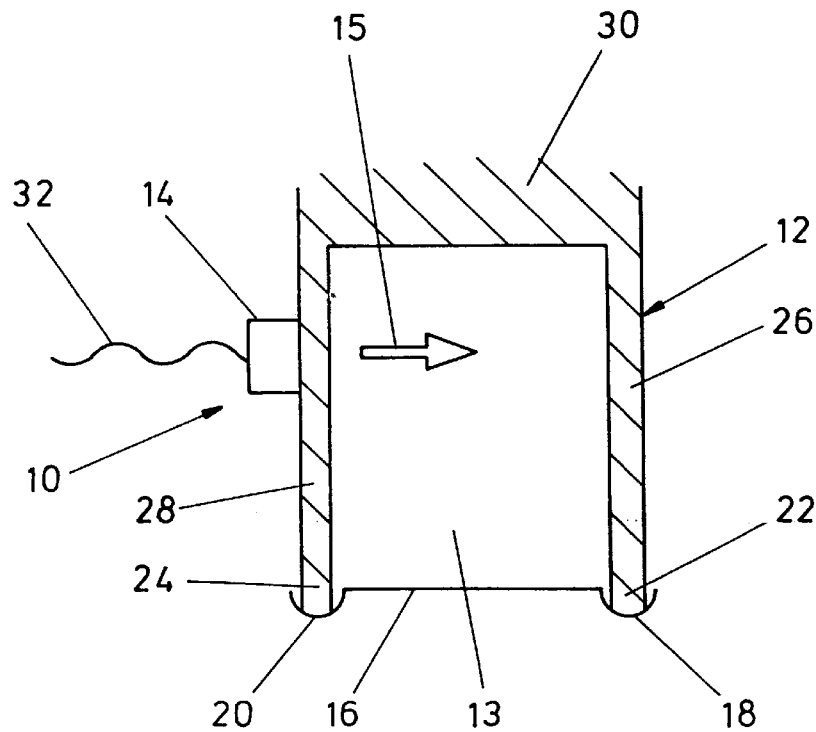
FIG. 1 shows a section through a vehicle tire and an associated wheel rim, the figure showing an ultrasonic transducer positioned in relation to the tire for testing purposes.

As shown in FIG. 1, apparatus 10 for testing an inflated vehicle tire 12 having an air space 13, to determine an internal physical characteristic thereof, such as the internal pressure, is provided in the form of an ultrasonic transducer 14 to produce waveform pulses 15.

Tire 12 is mounted on the usual wheel rim 16 having edge regions 18 and 20 to receive the complementary tire bead 22, 24.

Tire 12 comprises tire walls 26, 28 and a central body portion 30 having a road-contacting tread (not shown).

The ultrasonic transducer 14 will now be described further. Transducer 14 comprises combined ultrasonic transmitter and receiver apparatus provided with an electric supply 32 and adapted to generate and transmit ultrasonic waveforms at a chosen frequency or frequencies. The transducer likewise comprises ultrasonic receptor apparatus positioned alongside or integrated with the transmitter apparatus and screened therefrom and adapted to receive and detect an attenuated waveform after its transmission and interaction with the inflated tire.

As shown in FIG. 1, transducer 14 is located externally of the tire. In this embodiment the transducer is shown in contact with tire wall 28. In an alternative embodiment (not shown) the transducer is spaced a short distance from the tire wall, whereby the tire can be rotated during testing. This latter approach enables an averaged determination to be made of the air pressure within the tire. A series of readings is obtained and averaged (to eliminate or reduce measurement errors) and the pressure determined in accordance with the equation quoted above.

Figure 5:
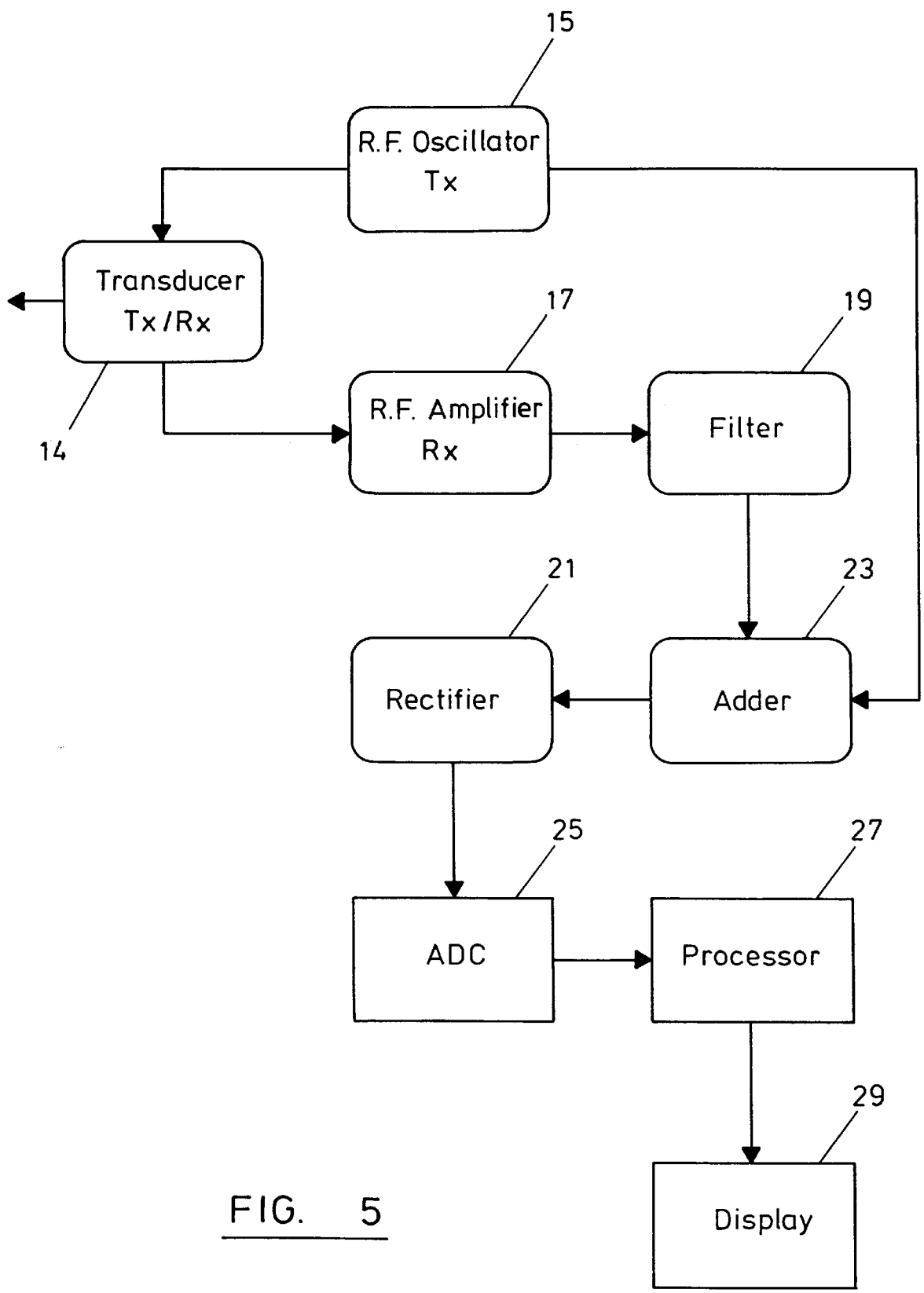
FIG. 5 shows a block-type circuit diagram for ultrasonic waveform transmitter/receiver apparatus and associated waveform interpretation apparatus.

There is shown in FIG. 5 the circuit diagram for transducer 14 and its associated waveform interpretation apparatus. As indicated in FIG. 5 transducer 14 is directly connected to associated radio frequency oscillator and amplifier functions, 15 and 17, which are associated with the transmission and reception functions of transducer 14. Amplifier 17 cooperates with associated filtering and adding and rectifying and analog-to-digital conversion functions 19, 21, 23 and 25 respectively, followed by processing and display functions 27 and 29. An output from oscillator 15 is associated with addition function 23.

With respect to interpretation of the waveform received by the combined transmitter and receptor apparatus during use, this function is performed by a data processing circuit forming part of processor 27 and provided with software for determination of tire pressure and/or other selected characteristics in accordance with the equation/expression quoted above or related functions in which the received waveform is interpreted by reference to the decay or attenuation of the amplitude of the waveform with time. Calibration of the apparatus is carried out at the pre-production stage. The flow chart of the software algorithm for these interpretation functions is provided in FIG. 6.

Figure 6:
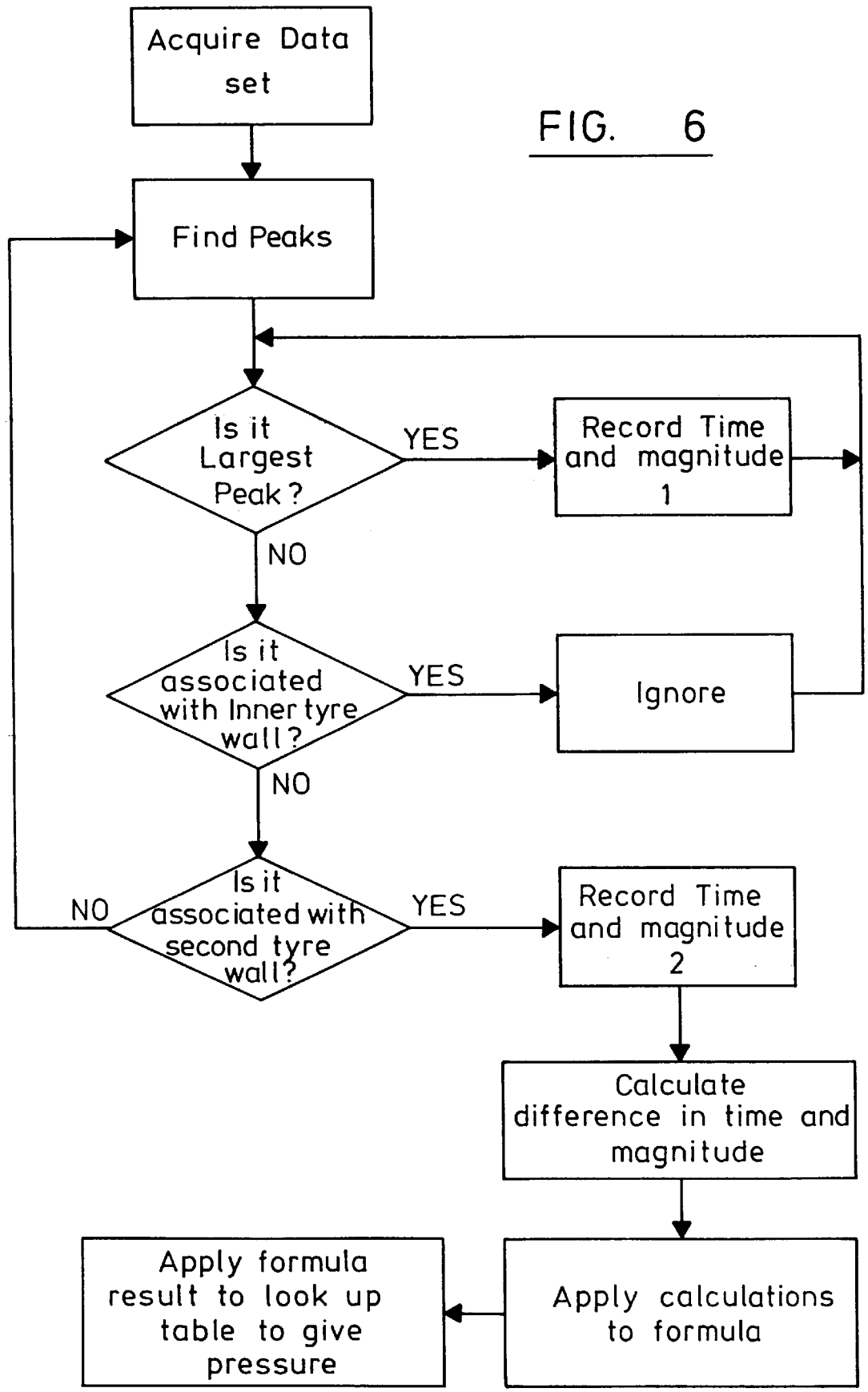
FIG. 6 shows a flow chart for the software algorithms utilized in the waveform interpretation process.

As shown in FIG. 6, the flow chart of the software algorithms comprises the following steps:

acquire data set;

find peaks;

is it largest peak? YES/NO;

if yes, record time and magnitude;

if no, is it associated with inner tire wall?

if yes, ignore;

if no, is it associated with second tire wall?

if yes, record time and magnitude;

if no, return to find peaks step;

calculate difference in time and magnitude;

apply calculations to formula;

apply formula result to look up table to give pressure.

In the above steps, the application of the formula is in accordance with matters discussed below.

Figure 2:
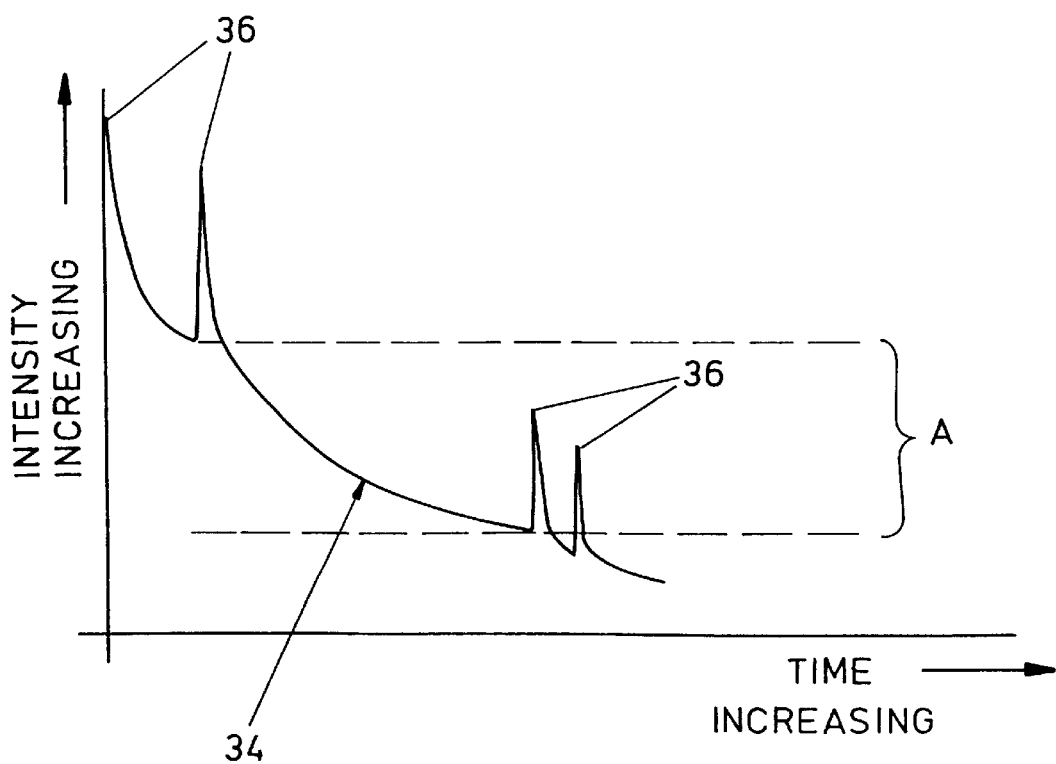
FIG. 2 shows the waveform obtained from the apparatus of FIG. 1 for the purpose of determining tire pressure.

As shown in FIG. 2, the output of transducer 14 may be displayed on an oscilloscope visual display unit if desired, although display is not a requirement for pressure determination.

Trace 34 comprises peaks 36 representing wave reflection at the tire walls 26, 28.

As shown in FIG. 2, the waveform intensity attenuation "A" between successive peaks 36 is proportional to an exponential function of an attenuation constant ($\alpha$) for the tire in question and the tire inner width (r):

$$A\alpha e^{-\alpha r} \text{OR} A = K e^{-4\alpha r}$$

Therefore, since the tire pressure is likewise proportional to the same function, the attenuation provides a measure of tire pressure, which is susceptible to calibration.

Figure 3:
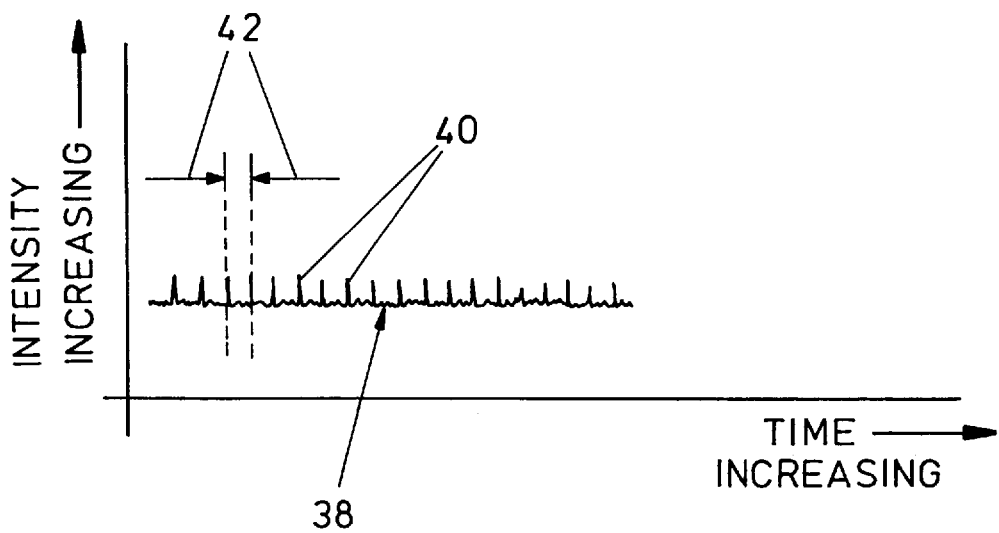
FIG. 3 shows a corresponding trace from the transducer and utilized to determine the condition and spacing of the internal tire braid within the tire.

FIG. 3 shows a typical trace from the transducer 14, as displayed upon an oscilloscope vdu during use to determine the condition and spacing of the tire braid or reinforcement material within the polymeric body of the tire.

Trace 38 shows multiple peaks 40 corresponding to the braid structure of the tire.

FIG. 3 shows the spacing 42 between successive peaks 40 which may be employed as an element in the interpretation of the trace On the basis of a knowledge of the original braided structure of the tire, interpretation of the trace enables evaluation of the condition of the tire. The interpretation apparatus may be pre-programmed with data relating to the original tire structure for comparison purposes.

Figure 4:
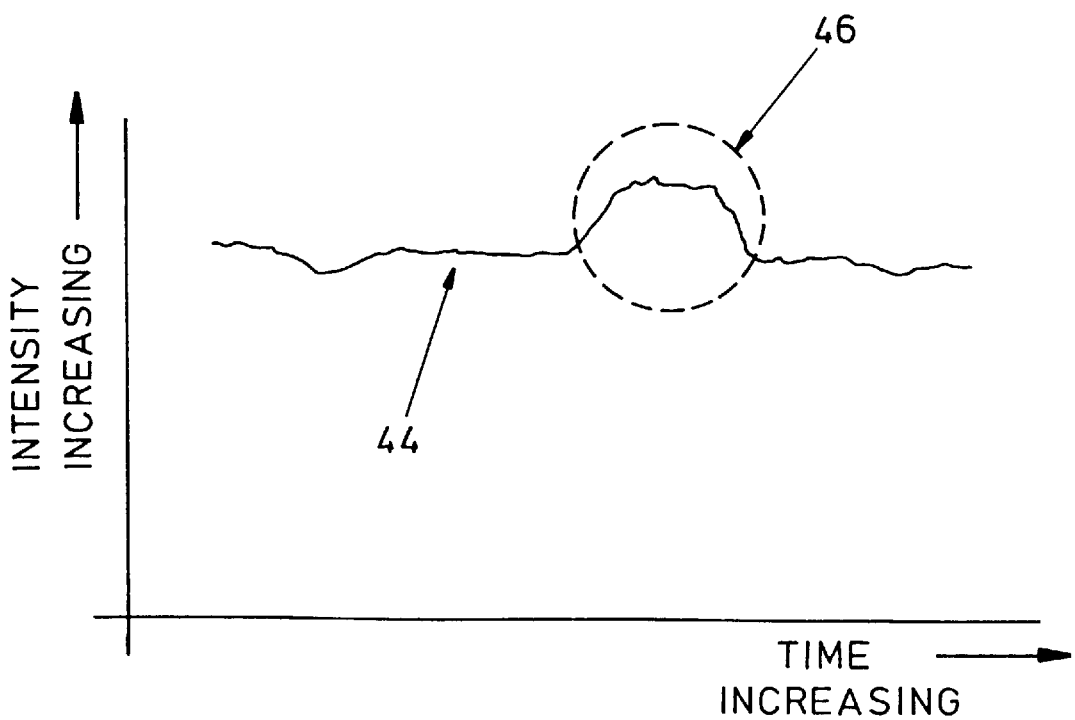
FIG. 4 shows a corresponding waveform obtained from the apparatus and illustrating a defect such as a rip detected in the internal tire wall.

The trace 44 in FIG. 4 shows at 46 the region of a tire defect, for example a rip in the tire wall which produces an increase in intensity of the trace due to the reduced distance between the tire/air interface and the transducer 14. Tire blisters produce likewise readily recognizable traces including a return echo for each blister.

Among other modifications which could be made in the above embodiments while remaining within the scope of the invention are the use of ultrasonic transmitter and receiver apparatus at opposite sides of the tire, the use of significantly differing waveform frequencies and alternative interpretational techniques.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A method of testing inflated vehicle tires to determine an internal physical characteristic thereof, comprising:

(a) transmitting an ultrasonic waveform from an external location with respect to the tire;

(b) subjecting the tire to be tested to said waveform;

(c) receiving a waveform from the tire at a location external to the tire;

(d) interpreting the received waveform by reference to the attenuation of the amplitude of said received waveform with time, to provide a measure of said internal physical characteristic; and (e) calculating the air pressure in the tire on the basis of the characteristics of said received waveform.

2. The method according to claim 1, wherein the step of interpreting the received waveform includes interpreting the attenuation of the amplitude of the peaks of said received waveform as affected by the structure of the tire under test.

3. The method according to claim 2, and further comprising displaying said received waveform.

4. Apparatus for testing inflated vehicle tires to determine an internal physical characteristic thereof, the apparatus comprising:

(a) waveform transmission means for subjecting a tire to be tested to a transmitted waveform and for transmitting an ultrasonic waveform from a location external to the tire under test;

(b) waveform reception means for receiving the ultrasonic waveform from a tire under test at a location external thereto; [and]

(c) waveform interpretation means for interpreting the received waveform with reference to the attenuation of the amplitude of said received waveform with time to provide a measure of said internal physical characteristic; and (d) signal processing means for calculating tire pressure on the basis of the characteristic of the received waveform.

5. The apparatus of claim 4, wherein said waveform interpretation means includes visual display means whereby said received waveform can be interpreted by visual inspection.

* * * * *